US011444522B2

(12) United States Patent
Bourgeois

(10) Patent No.: US 11,444,522 B2
(45) Date of Patent: Sep. 13, 2022

(54) SYNCHRONOUS ELECTRICAL MACHINE WITH ROTOR HAVING ANGULARLY SHIFTED PORTIONS

(71) Applicant: SAFRAN ELECTRICAL & POWER, Blagnac (FR)

(72) Inventor: Lionel Bourgeois, Blagnac (FR)

(73) Assignee: SAFRAN ELECTRICAL & POWER, Blagnac (FR)

( * ) Notice: Subject to any disclaimer, the term of this patent is extended or adjusted under 35 U.S.C. 154(b) by 88 days.

(21) Appl. No.: 17/047,099

(22) PCT Filed: Apr. 12, 2019

(86) PCT No.: PCT/FR2019/050862
§ 371 (c)(1),
(2) Date: Oct. 13, 2020

(87) PCT Pub. No.: WO2019/202241
PCT Pub. Date: Oct. 24, 2019

(65) Prior Publication Data
US 2021/0152065 A1 May 20, 2021

(30) Foreign Application Priority Data

Apr. 17, 2018 (FR) ........................................ 1853381
Dec. 19, 2018 (FR) ........................................ 1873356

(51) Int. Cl.
*H02K 19/10* (2006.01)
*H02K 1/24* (2006.01)
(Continued)

(52) U.S. Cl.
CPC ........... *H02K 19/103* (2013.01); *H02K 1/246* (2013.01); *H02K 15/022* (2013.01); *H02K 15/026* (2013.01); *H02K 19/20* (2013.01)

(58) Field of Classification Search
CPC ...... H02K 19/103; H02K 19/20; H02K 1/246; H02K 1/182; H02K 16/02; H02K 3/525;
(Continued)

(56) References Cited

U.S. PATENT DOCUMENTS 3,437,897 A * 4/1969 Lenny .................... H02K 21/24
310/156.43
3,473,061 A 10/1969 Soehner
(Continued)

FOREIGN PATENT DOCUMENTS

DE 195 47 016 A1 6/1997
FR 2 406 333 A1 5/1979
(Continued)

OTHER PUBLICATIONS

International Search Report, dated Jun. 17, 2019, issued in corresponding International Patent Application No. PCT/FR2019/050862, filed Apr. 12, 2019, 6 pages.
(Continued)

*Primary Examiner* — Michael Andrews
(74) *Attorney, Agent, or Firm* — Christensen O'Connor Johnson Kindness PLLC

(57) ABSTRACT

The disclosure relates to a brushless and magnet-free synchronous electrical machine, wherein it comprises a stator (20) comprising a ring (22), a winding (28) and a tooth system (24) comprising teeth (26) extending parallel to the axis of rotation from the ring (22), said winding being wound around the tooth system (24), a rotor (10), comprising a first portion (12a) extending in p preferred directions (18a), a second portion (12b) extending in p preferred directions (18b) shifted by p with respect to the preferred directions of the first portion (18a), and an intermediate portion (14) linking the first portion (12a) to the second portion (12b), and a coil (40) for exciting the rotor, fixed (Continued)

US 11,444,522 B2

Page 2 with respect to the stator, supplied with a DC electric current, positioned around the intermediate portion (14) of the rotor and configured so as to generate an electric flux in the rotor (10) through magnetic induction.

10 Claims, 6 Drawing Sheets

(51) Int. Cl.
    *H02K 19/20*     (2006.01)
    *H02K 15/02*     (2006.01)

(58) Field of Classification Search
    CPC ...... H02K 3/325; H02K 9/197; H02K 15/022; H02K 15/026; H02K 2201/12
    USPC ........ 310/168, 114, 257, 49.38, 49.39, 49.41
    See application file for complete search history.

(56) References Cited

U.S. PATENT DOCUMENTS

| | | | | |
|---|---|---|---|---|
| 4,385,251 A | * | 5/1983 | Mallick | H02K 19/20 322/48 |
| 4,611,139 A | * | 9/1986 | Godkin | H02K 19/24 310/90 |
| 5,854,526 A | * | 12/1998 | Sakamoto | H02K 21/16 310/179 |
| 2004/0046470 A1 | * | 3/2004 | Decristofaro | H02K 15/026 428/592 |
| 2005/0258705 A1 | * | 11/2005 | Berwald | B23C 3/00 335/297 |
| 2009/0160288 A1 | * | 6/2009 | Calley | H02K 19/22 310/263 |
| 2014/0084716 A1 | | 3/2014 | Bernot | |
| 2014/0111059 A1 | * | 4/2014 | Lin | H02K 15/026 310/216.001 |
| 2015/0372568 A1 | * | 12/2015 | Körner | H02K 7/08 310/54 |

FOREIGN PATENT DOCUMENTS

| | | |
|---|---|---|
| WO | 2012/085438 A2 | 6/2012 |
| WO | 2016/138159 A1 | 9/2016 |

OTHER PUBLICATIONS

Written Opinion, dated Jun. 17, 2019, issued in corresponding International Patent Application No. PCT/FR2019/050862, filed Apr. 12, 2019, 8 pages.

* cited by examiner

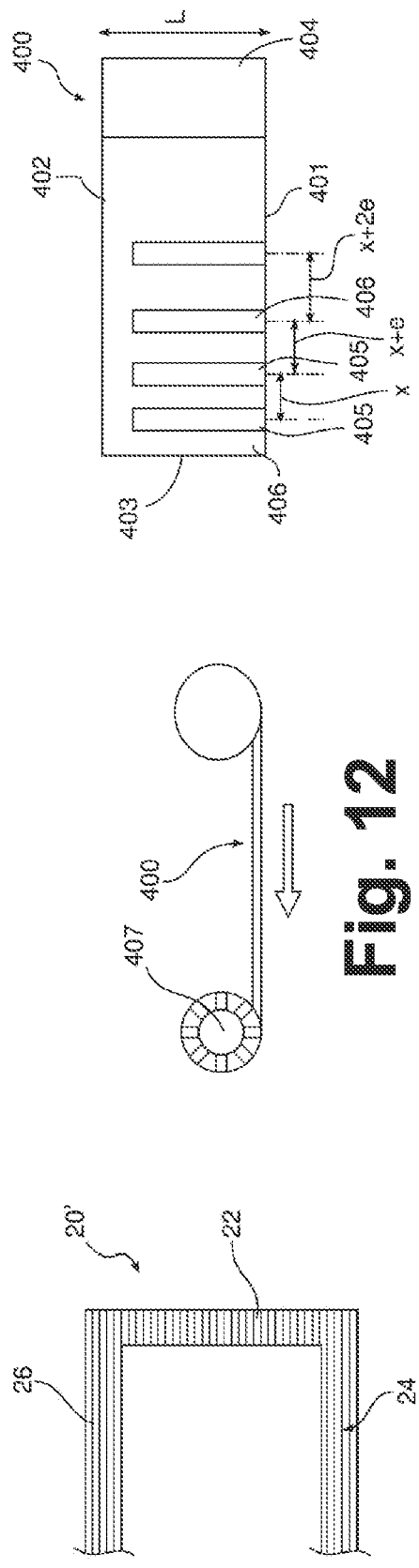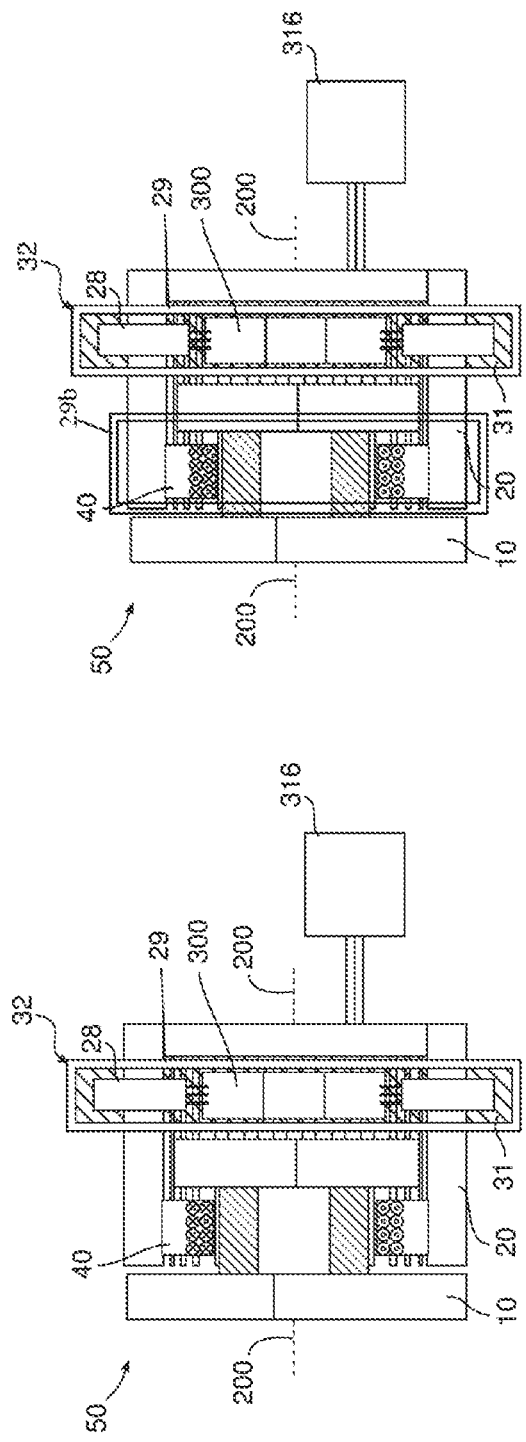

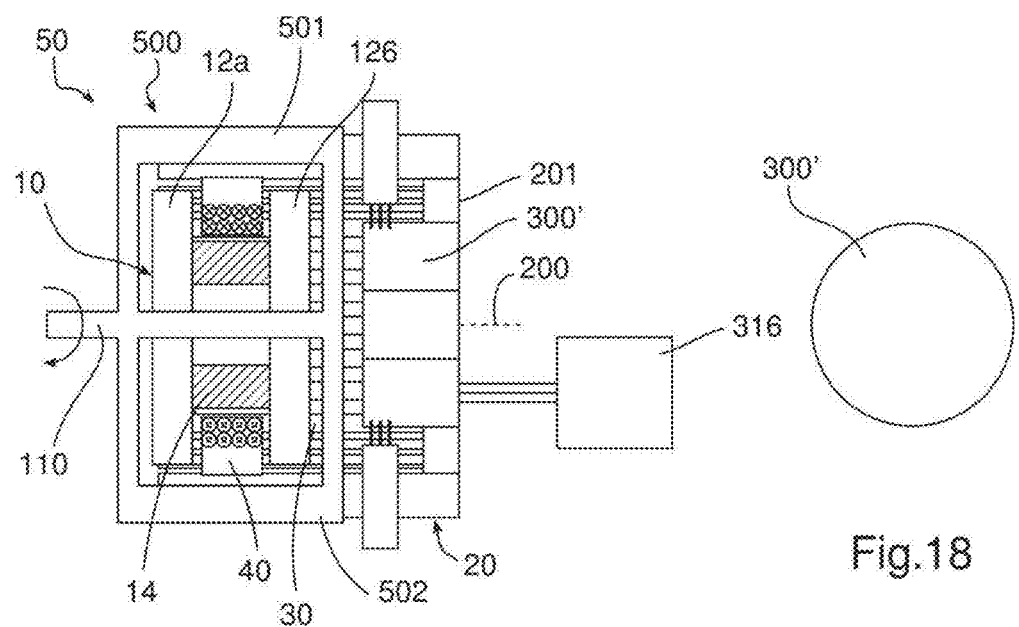
Fig.17
Fig.18
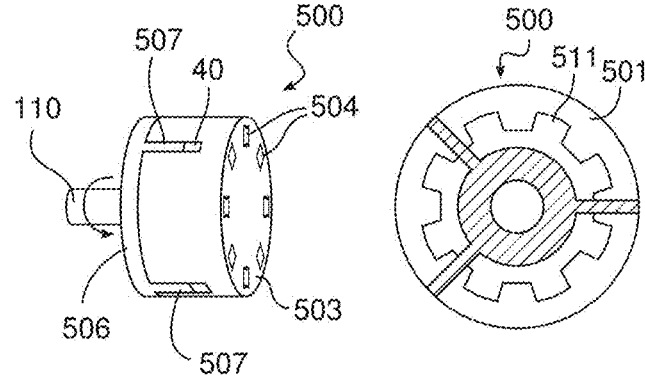
Fig.19
Fig.20
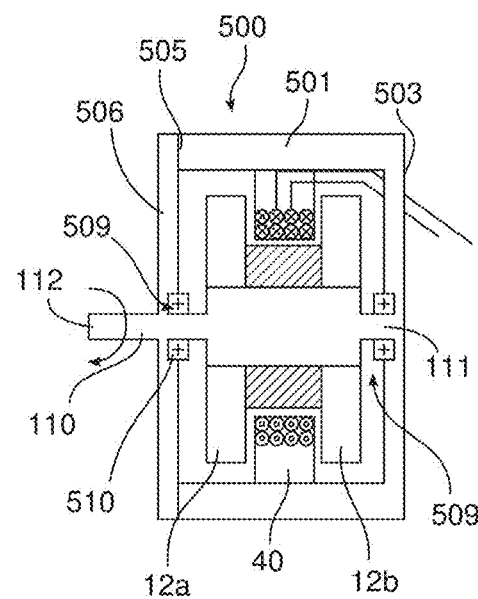
Fig.21

SYNCHRONOUS ELECTRICAL MACHINE WITH ROTOR HAVING ANGULARLY SHIFTED PORTIONS

TECHNICAL FIELD OF THE INVENTION

The invention relates to the field of electrical machines, in particular synchronous electrical machines which can serve both as motor and as electric generators. In particular, the invention relates to a brushless and magnet-free synchronous electrical machine.

BACKGROUND

The prior art includes in particular the documents WO-A2-2012/085438, U.S. Pat. No. 3,473,061, WO-A1-2016/138159, DE-A1-195 47 016 and FR-A1-2 406 333.

The synchronous electrical machines with rotor excitation flux are currently divided into two main categories: the permanent magnet machines and the brush machines.

The permanent magnet machines have the advantage of being able to achieve high torque densities and low rotor losses, but they have the disadvantage of having to incorporate magnets that are expensive to purchase and complicate the manufacturing process.

Moreover, the evolution of the technology and its consequences on the consumer market is generating an exponential consumption of certain rare earths which can lead to an increase in the cost of magnets using these rare earths (Samarium Cobalt or Neodymium Iron Boron magnets for example), or even a shortage.

The brush machines do not have the drawbacks of magnets but do not have their advantages either. In addition, the brush system requires maintenance operations related to mechanical wear of the brushes (brush replacement) which is burdensome for the user.

To avoid these disadvantages, solutions have been proposed.

For example, the multi-stage generators that use a "rotating transformer" that generates an alternating electrical signal to the rotor on a first stage, which is then rectified by a rotating diode bridge (second stage) that supplies coils fixed on rotor magnetic projections (electromagnets forming the main excitation) that represent the third stage. These machines are often generators, called three-stage generators, which have a great complexity due to the transformer and the rotating rectifier.

The inventors therefore sought other solutions to benefit from the advantages of permanent magnet machines without the disadvantages of brushes or the like requiring a mechanical rotating contact for the transmission of electricity.

SUMMARY OF THE INVENTION

For this purpose, the invention relates to a brushless and magnet-free synchronous electrical machine configured to drive a rotating element in rotation around an axis of rotation of the electrical machine or to generate electrical energy from the mechanical energy transmitted by said rotating element, characterized in that it comprises:
- a stator disposed around the axis of rotation of the electrical machine, comprising a ring extending along a preferred plane perpendicular to said axis of rotation and comprising a winding and a denture comprising teeth extending parallel to the axis of rotation from the ring, said winding being coiled around the denture according to the preferred plane and the denture delimiting an inner zone of the stator around the axis of rotation,
- a rotor, comprising a first portion extending in p first preferred directions parallel to the preferred plane, a second portion extending in p second preferred directions angularly shifted by $\pi/p$ with respect to the first preferred directions of the first portion and parallel to the preferred plane, and an intermediate portion linking the first portion to the second portion, the rotor being arranged in such a way that at least the second portion and the intermediate portion are in the inner zone of the stator and that the second portion is located on the side of the ring, and
- an excitation coil for exciting the rotor, fixed with respect to the stator, supplied with DC electric current, arranged around the intermediate portion of the rotor and configured so as to generate a magnetic flux in the rotor by magnetic induction, such that the first portion of the rotor constitutes p north magnetic poles of the rotor and the second portion of the rotor constitutes p south magnetic poles of the rotor.

An electrical machine according to the invention therefore makes it possible to polarize the rotor without the need for permanent magnets or brushes, thanks to the excitation coil (also called induction coil) located at the intermediate portion of the rotor.

The excitation coil of the rotor is fixed with respect to the stator, which limits the complexity compared to the solutions of the prior art with rotating parts (three-stage generator in particular). The supply of the excitation coil is facilitated because the excitation coil does not enter the movement zone of the north and south poles of the rotor (respectively the first portion of the rotor and the second portion of the rotor). The excitation coil thus creates the magnetic poles by magnetic induction at the intermediate portion without causing any mechanical interaction with the moving magnetic poles. The coil can be simple, e.g. only a concentric coil, can be supplied with direct current and is therefore cost-effective.

The rotor is said to be "cold" because no windings are attached to it and therefore there is no conduction heating, but only radiation heating from the excitation coil. The greater the air gap with the excitation coil, the lower the radiation. The flux through the rotor is continuous because it is created by the continuously supplied excitation coil, which results in the absence of hysteresis and eddy current losses, except at the ends facing the stator due to potential variations in reluctance. In addition, the rotor is off-centre with respect to the winding of the stator located at the teeth near the ring and the rotor does not receive radiated calories from the winding of the stator. For all these reasons, the service life of the components is improved, in particular the bearing life of the electrical machine.

The absence of brushes increases reliability and reduces maintenance costs. The absence of magnets reduces costs and dependence on rare earths.

Finally, the arrangement of the denture of the stator, parallel to the axis of rotation, simplifies the positioning of the winding of the stator during the manufacture, by simply inserting the winding through the face of the stator comprising the free ends of the denture opposite the ring of the stator.

The electrical machine can be operated as a motor as well as a generator. In generator operation, the rotor can be directly attached to the rotating mechanical drive element, and the stator attached to the fixed part of the rotating drive element. In this case, the electrical machine can operate without a bearing between the rotor and the stator: the rotor rotates in the stator without the need for a bearing. This is the case, for example, if the rotor is fixed to the output shaft of a reduction gear and the stator is fixed to the casing of the reduction gear.

According to a characteristic of the invention, the electrical machine comprises an integrated electronic device which is arranged inside the stator. Such a configuration is easy to implement since it allows the unoccupied space inside the stator to be filled. This makes it possible not to lengthen the electrical machine nor to increase its diameter, unlike other solutions of the prior art which provide for the arrangement of electronic elements at the rear of the electrical machine or around it. The electrical machine is thus compact.

Advantageously, but not limited to, the integrated electronic device is arranged in the inner zone of the stator and between the rotor and a rear face of the ring of the stator along the axis of rotation.

According to another characteristic, the stator is laminated and made in one piece to limit eddy current losses.

Advantageously, but not restrictively, the stator comprises a plurality of sheets of ferromagnetic sheet metal arranged one above the other along a radial axis perpendicular to the axis of rotation.

According to a characteristic of the invention, the laminated stator is made from a single strip of ferromagnetic sheet metal.

According to another characteristic, the electrical machine comprises a first housing comprising a first cooling fluid and in which the stator winding and/or the integrated electronic device is/are installed. Such an arrangement allows the stator winding and/or the integrated electronic device to be cooled more efficiently through the core. The temperature gradients are reduced, which results in a more homogeneous internal temperature and increases the reliability of the electrical machine. In addition, filling the first housing with a cooling fluid helps to dampen vibrations.

Another characteristic is that the electrical machine comprises a second housing comprising a second cooling fluid, with the excitation coil arranged inside this second housing. As explained previously, installing the excitation coil in a casing filled with a cooling fluid allows it to be cooled more efficiently through the core, to reduce temperature gradients to increase the performance of the electrical machine, to dampen vibrations during operation of the electrical machine and to avoid the risk of fire.

Advantageously, but not restrictively, the first and/or second cooling fluid comprises an oil. The oil acts as an effective damper. In addition, the components that are arranged in the first housing and/or second housing are not subject to moisture and as the entire space in the first and/or second housing is filled with oil, the risk of fire is limited.

According to a further embodiment of the invention, the electrical machine comprises a casing in which at least the rotor, the excitation coil mounted around the intermediate portion of the rotor and a drive shaft extending along the axis of rotation are accommodated, the drive shaft comprising a first end which is coupled to a bottom of the casing. Such an arrangement frees space for the arrangement of the integrated electronic device inside the stator since the drive shaft (which is intended to be coupled to the rotating element) does not extend through the ring of the stator. The drive shaft stops at the bottom of the casing.

The integrated electronic device is provided with a bore intended for the passage of a rotating element.

According to a further characteristic of this embodiment, the drive shaft is rotatably mounted in the casing and is guided in rotation via rotary guide bearings.

According to a characteristic, the casing comprises grooves or accommodations each intended to receive at least partially the free end of the teeth of the stator so as to stiffen the assembly.

According to another characteristic, the machine comprises a flange configured to close the casing, the flange comprising accommodations each intended to receive at least partially the free end of the stator teeth so as to stiffen the assembly.

Advantageously and according to the invention, the maximum length of the first portion of the rotor is greater than the diameter of the inner zone of the stator, and the first portion of the rotor is outside the inner zone of the rotor, facing the ends of the teeth of the denture of the stator, opposite the ring.

According to this aspect of the invention, the first portion of the rotor operating as a succession of magnetic poles of the same polarity is positioned axially with respect to the magnetic circuit formed by the stator, while the second portion of the rotor operating as a succession of magnetic poles of opposite polarity to the first portion is positioned radially with respect to the magnetic circuit formed by the stator.

Advantageously and according to the invention, the maximum length of the first portion of the rotor is smaller than the diameter of the inner zone of the stator, and the first portion of the rotor is arranged in the inner zone of the stator.

According to this aspect of the invention, the entire rotor is arranged in the inner zone of the stator and the two sequences of magnetic poles of the rotor are positioned radially with respect to the magnetic circuit formed by the stator.

Advantageously and according to the invention, the first portion of the rotor and the second portion of the rotor are in the form of a straight cylinder having as its base a truncated disc of p segments angularly shifted by $2\pi/p$, formed by distinct chords parallel and symmetrical with respect to the centre of the disc, said cylinder comprising a bore around the centre of the disc intended to receive the rotating element.

According to this aspect of the invention, the rotor portions have a maximum length equal to the maximum diameter of the truncated disc forming the base of the cylinder and each segment composing them has a width equal to the distance between the two chords of this segment. The preferred direction of each segment of each rotor portion is parallel to the two chords of that segment.

The rotor portions can be manufactured directly from a straight cylinder of revolution having as a base the complete disc by machining the 2p segments.

The shape of the rotors is particularly suitable for rotating parts and fits perfectly with the ring-shaped stator for the circulation of the magnetic flux, minimizing the air gap on the parts forming the magnetic poles.

Advantageously and according to the invention, the intermediate portion has the shape of a cylinder of revolution.

According to this aspect of the invention, the intermediate portion is optimized to receive the excitation transmitted by the ring-shaped excitation coil around the intermediate portion. In addition, the intermediate portion is free of unbalance during rotation. The cylinder is hollow to allow the introduction of the rotating element.

Advantageously and according to the invention, the electrical machine comprises a DC voltage generator for supplying the excitation coil, said DC voltage generator being configured to deliver a DC electric current of adjustable current value.

According to this aspect of the invention, a change in the value of the DC supply current of the excitation coil enables the magnetic flux circulating in the machine to be adjusted. In particular, this allows the adjustment of the torque delivered by the electrical machine when it is operating in motor mode. It also allows a simple "defluxing" when it is operating in motor mode and it is necessary to increase its speed by reducing its electromotive force.

It also allows simple adjustment of the output voltage across the winding of the stator when operating in generator mode.

Advantageously and according to the invention, the winding of the stator comprises a multiple number of phases distributed over the denture of the stator, in particular three phases.

According to this aspect of the invention, the stator is equipped with a standard three-phase winding for the operation of the electrical machine.

According to other variants of the invention, the winding may comprise another number of phases depending on the desired application.

The invention also relates to an electrical machine characterized in combination by all or some of the characteristics mentioned above or below.

The invention further relates to a method for making a stator of an electrical machine having any of the above characteristics, the method being characterized in that it comprises the following steps:
- providing a strip of ferromagnetic sheet metal comprising a predetermined width L in a first direction, the width L being measured between a first side and a second side of the strip of ferromagnetic sheet metal,
- making a plurality of notches by cutting so as to form tabs, and
- coiling the strip of sheet metal around a coiling axis so that several tabs are superimposed along a radial axis perpendicular to the coiling axis.

Advantageously, but not limited to, the first direction is parallel to the coiling axis.

According to this method, the distance between each successive notch is defined by the formula:

$$X + n \cdot e \quad \text{[Math 1]}$$

wherein n is an integer from 0 to K−2 and K is the number of notches.

According to this method, e is calculated according to the formula:

[Math 2]

$$R(\theta) = \left(\frac{e}{2p}\right) \cdot \theta + R_i$$

wherein Ri is the inner radius of the stator.

The invention also relates to a method of assembling an electrical machine having any of the above-mentioned characteristics. The method of assembling comprises the following steps:
- assembling a first sealed housing comprising a first cooling fluid, the stator winding and/or the integrated electronic device,
- inserting the first assembled housing on the stator, and
- inserting at least partially the rotor into the inner zone of the stator.

Such a method of assembling facilitates the assembly and maintenance of the electrical machine.

Following this method of assembling, the assembly step of the first housing comprises the following steps:
- installing a first cover in a sealed manner on radially inner and outer annular walls of the first housing,
- arranging the winding around projections extending from an inner surface of the first cover along the axis of rotation,
- linking the stator winding with the integrated electronic device,
- closing in a sealed manner the first housing with a second cover,
- injecting a cooling fluid into the first housing until it is filled.

BRIEF DESCRIPTION OF THE FIGURES

Other characteristics and advantages of the invention will appear during the reading of the following detailed description, for the understanding of which reference shall be made to the attached drawings in which:

FIG. 4a is a schematic right-hand view of an electrical machine according to an embodiment of the invention; FIG. 4b is a schematic front view of the electrical machine illustrated in FIG. 4a;

FIG. 11 is an embodiment of a laminated stator made in one piece according to the invention;

FIG. 12 represents a step in manufacturing of an example of a one-piece laminated stator according to the invention;

FIG. 13 illustrates an example of a strip of ferromagnetic sheet metal intended to produce a one-piece laminated stator according to the invention;

FIG. 14 shows another embodiment of an electrical machine comprising at least one insulating casing for the members of the electrical machine according to the invention;

FIG. 17 is an axial sectional view of an alternative embodiment of an electrical machine with integrated electronic device;

FIG. 18 is a rear view of the integrated electronic device for equipping the electrical machine shown in FIG. 17;

FIG. 19 is a schematic and perspective view of a casing in which components of the electrical machine such as a rotor according to the invention are accommodated;

FIG. 20 is a front view of the casing shown in FIG. 19 according to the invention;

FIG. 21 is an axial and detailed sectional view of the casing for equipping the electrical machine shown in FIG. 17 according to the invention.

DETAILED DESCRIPTION OF THE INVENTION

The following embodiments are examples. Although the description refers to one or more embodiments, this does not necessarily mean that each reference refers to the same embodiment, or that the characteristics apply only to one embodiment. Simple characteristics of different embodiments can also be combined to provide other embodiments. In the figures, the scales and proportions are not strictly adhered to for the sake of illustration and clarity.

The following figures describe the components of a brushless and magnet-free synchronous electrical machine according to an embodiment of the invention, configured to drive a rotating element in rotation around an axis of rotation of the electrical machine or to generate electric energy from the mechanical energy transmitted by said rotating element.

Figures 1A, 1B, 1C:
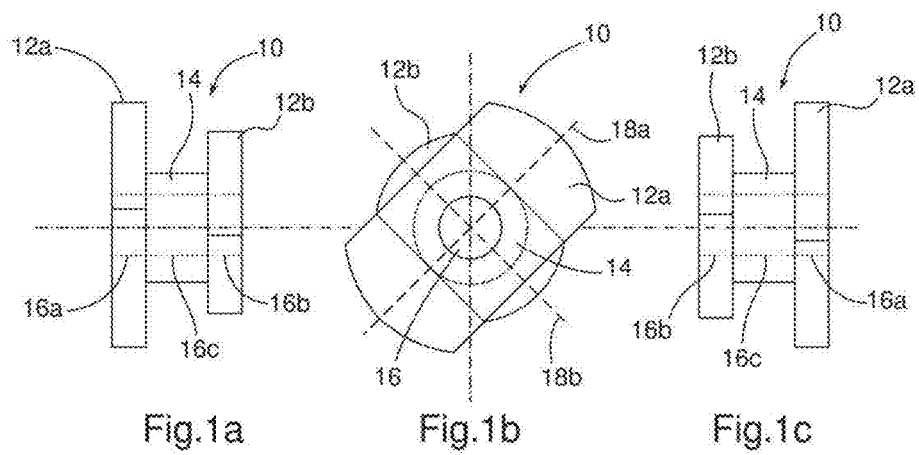
FIG. 1a is a schematic right-hand view of a rotor of an electrical machine in an embodiment of the invention for p=2.
FIG. 1b is a schematic front view of a rotor of an electrical machine according to an embodiment of the invention for p=2.
FIG. 1c is a schematic left-hand view of a rotor of an electrical machine according to an embodiment of the invention for p=2.

FIGS. 1a, 1b and 1c schematically represent a rotor 10 of an electrical machine according to an embodiment the invention as seen from the right, front and left, respectively.

The rotor 10 comprises a first portion 12a and a second portion 12b connected by an intermediate portion 14.

The first portion 12a and the second portion 12b have the shape of a straight cylinder having as a base a truncated disc of two segments formed by distinct chords parallel and symmetrical with respect to the centre of the disc. Each first and second portion comprises a bore (respectively referenced 16a and 16b) around the centre of the disc intended to receive the rotating element.

The intermediate portion 14 is a cylinder of revolution comprising in the same way a bore intended to receive the rotating element.

The three bores 16a, 16b and 16c are thus of the same size and aligned so as to form a through bore 16 configured to receive the rotating element in the rotor 10.

As seen in FIG. 1b, the first portion 12a has a first preferred direction 18a, and the second portion 12b has a second preferred direction 18b. The first preferred direction 18b is perpendicular to the second preferred direction 18b.

The intermediate portion 14 may extend parallel to the axis of rotation.

Figures 2A, 2B:
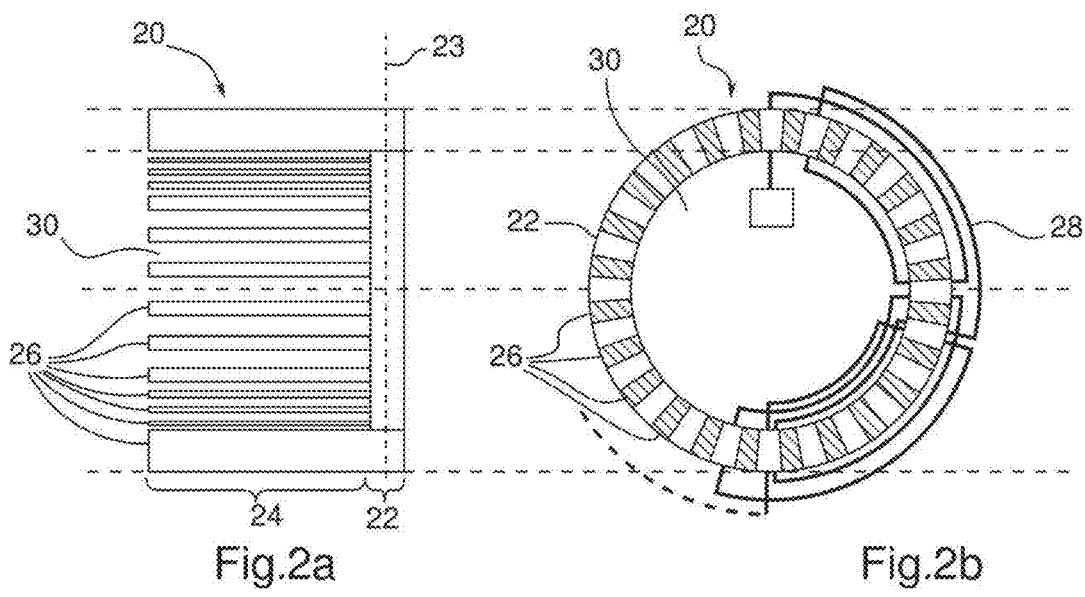
FIG. 2a is a schematic right-hand view of a stator of an electrical machine according to an embodiment of the invention.
FIG. 2b is a schematic front view of a stator of an electrical machine according to an embodiment of the invention.

FIGS. 2a and 2b schematically represent a stator 20 of an electrical machine according to an embodiment of the invention, seen respectively from the right and from the front.

The stator 20 comprises a ring 22 extending in a preferred plane 23, a denture 24 and a winding 28.

The denture 24 comprises a plurality of teeth (only a part of which is referenced under the reference 26 in the figures for reasons of clarity) extending from the ring 22 parallel to the axis of the ring which will be the axis of rotation of the rotating element. The winding 28 is shown in part in FIG. 2b, and is coiled around the teeth 26 of the denture. Only one phase of the winding is shown here, as the winding may comprise several phases in a known way. Similarly, the coiling around the teeth is shown as an example and other coiling schemes can be used depending on the characteristics of the desired stator.

The teeth of the denture delimit an inner zone 30 of the stator, which forms a cylinder of revolution around the axis of rotation of the rotating element.

Figures 3A, 3B:
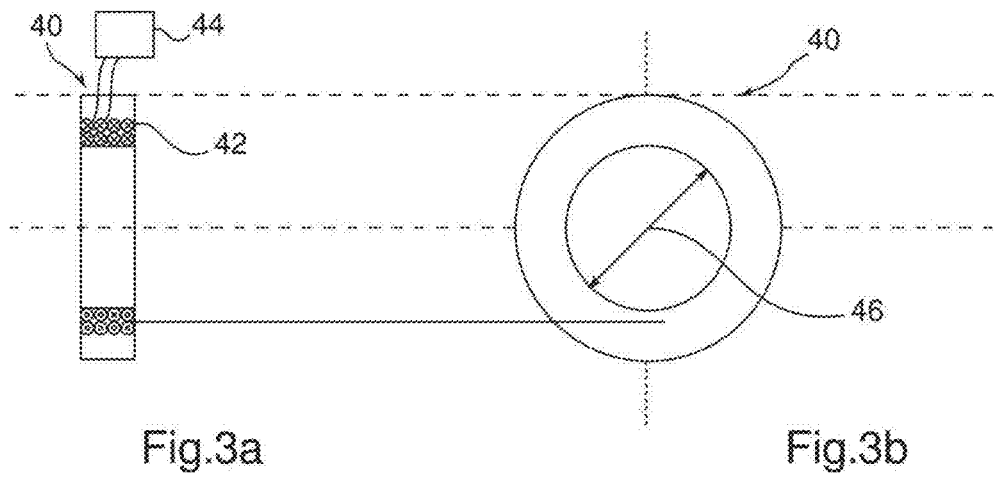
FIG. 3a is a schematic right-hand view of an excitation coil of an electrical machine according to an embodiment of the invention.
FIG. 3b is a schematic front view of an excitation coil of an electrical machine according to an embodiment of the invention.

FIGS. 3a and 3b schematically represent an excitation coil 40 for exciting an electrical machine according to an embodiment of the invention, respectively seen from the right and from the front.

The excitation coil 40 takes the form of a ring in which the conductive wire 42 forming the excitation coil 40 is coiled. The excitation coil is supplied by a direct current generator 44, the value of which can be adjusted.

The inner diameter 46 of the excitation coil 40 must be slightly larger than the outer diameter of the intermediate portion 14 of the rotor in order to allow the magnetic induction thereof.

Figures 4A, 4B:
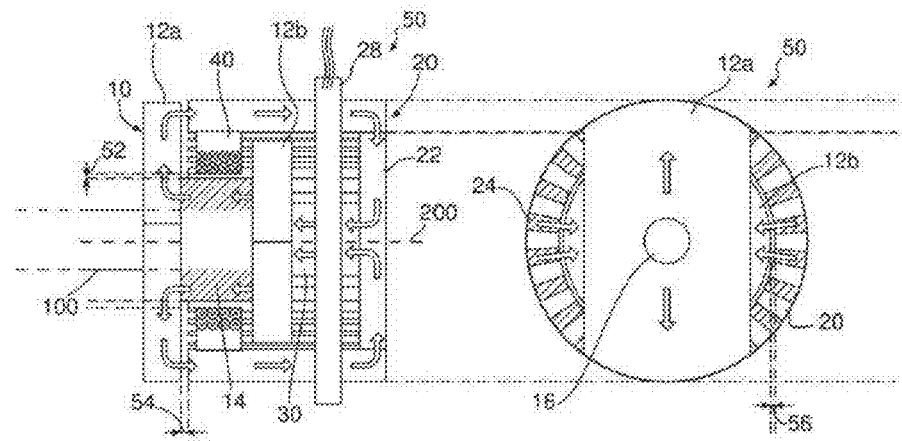

FIGS. 4a and 4b schematically represent an electrical machine 50 according to an embodiment of the invention, seen respectively from the right and from the front. The electrical machine is the assembly of the rotor 10, the stator 20 and the excitation coil 40 as described above.

The rotating element 100 associated with the electrical machine 50 is shown inserted in the rotor 10. It rotates around the axis 200 of rotation.

In the assembled electrical machine, the axis 200 of rotation is also the axis of rotation of the rotor, and the axis around which the excitation coil 40 and the stator 20 are arranged.

The winding 28 of the stator is represented by a single element for schematic purposes and is arranged on the side of the ring 22 of the stator 20.

The rotor 10 is arranged at least partly in the inner zone 30 formed by the denture of the stator. Here, the intermediate portion 14 and the second portion 12b are arranged in the inner zone 30. When the electrical machine 50 is in operation, the stator 20 is stationary and the rotor 10 is rotating with respect to the stator 20. One or more bearings (not shown) arranged between the rotor 10 and the stator 20 can be used to hold the elements in place. Alternatively, in generator operation, the rotating element holds the rotor 10 in place in the stator 20 and no bearings are required.

The excitation coil 40 is arranged in the stator 20 around the intermediate portion 14 of the rotor 10 leaving an air gap 52. When supplied, it causes a continuous magnetic flux in the rotor 10, represented by arrows, by induction. The DC electric flux allows polarization of the rotor, so that the first portion 12a behaves as a north magnetic pole and the second portion 12b behaves as a south magnetic pole. Thus, the electric flux moves from the south pole to the north pole, i.e. from the second portion 12b of the rotor to the first portion 12a of the rotor, is transmitted axially through the denture of the stator via the air gap 54 between the first portion 12a and the stator 20. In other words, the electrical flux flows axially (along the axis 200 of rotation) through the teeth 26 of the stator 20. The magnetic flux then flows to the stator.

Due to its position at the intermediate portion 14, the excitation coil 40 is not influenced by the poles it creates when said poles rotate.

As can be seen in FIG. 4b, the magnetic flux passes from the stator 20 to the south pole of the rotor, i.e. the second portion 12b, radially via the air gap 56. The fact that the preferred directions of the first portion 12a and the second portion 12b are perpendicular allows the teeth of the denture 24 to be alternately close to one pole and then to the other, allowing the flow of flux from the rotor to the stator or from the stator to the rotor in directions perpendicular to each other.

Another embodiment of this electrical machine is shown in FIGS. 5 to 10. The electrical machine 50 comprises the components similar to those of the electrical machine in FIGS. 4a and 4b. This embodiment differs from the previous one in that the electrical machine also comprises an integrated electronic device 300 inside it.

Figures 5, 6:
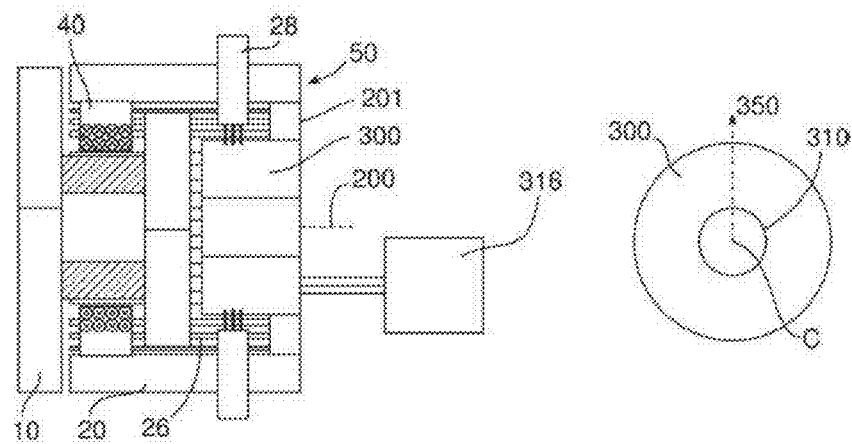
FIG. 5 illustrates another embodiment of an electrical machine comprising an integrated electronic device inside it.
FIG. 6 is a rear view of the integrated electronic device of the electrical machine shown in FIG. 5.

In particular, as can be seen in FIG. 5, the integrated electronic device is arranged at least partly inside the stator 20. This integrated electronic device 300 is arranged in the inner zone 30 of the stator. It is mounted along the axis 200 of rotation between the rotor 10 (in particular the second portion 12b) and a rear surface 201 of the stator.

With reference to FIG. 6, the integrated electronic device 300 has a central axis C annular shape. This has a diameter or length along a radial axis 350 perpendicular to the axis 200 of rotation. The diameter of the integrated electronic device 300 is smaller than the diameter of the inner zone 30 of the stator 20. The integrated electronic device 300 has a through hole 310 which passes through it on both sides along the central axis C. The latter is coaxial with the axis 200 of rotation. The element 100 is inserted through the integrated electronic device 300.

FIGS. 7 to 10 show different arrangements of the integrated electronic device 300 in the electrical machine 50.

Figure 7:
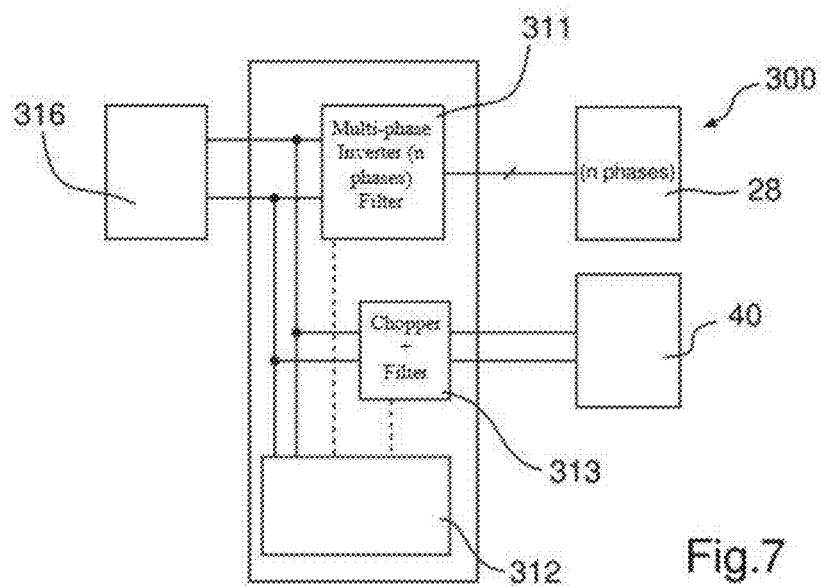
FIG. 7 is an example of the embodiment of an integrated electronic device according to the invention.

In FIG. 7, the electrical machine forms a synchronous motor powered by an electric power source 316. In this example, the power source is a DC electric power supply. The synchronous motor provides the torque required by the rotating element 100. The integrated electronic device comprise an inverter 311 that is powered from the DC electric power source. The inverter provides electrical energy to the winding 28 to which it is connected. This inverter 311 is multi-phased. In particular, it has two DC terminals coupled to the electric power source 316 and one AC terminal coupled to the winding 28.

The integrated electrical device 300 also comprises a control unit 312 which is electrically connected to the inverter 311 and the DC electric power source 316. This control unit 312 is configured so that the correct set points are generated to the inverter and a chopper described below of the excitation of the electrical machine.

a "rectifier+chopper+filter" assembly of the excitation of the electrical machine.

The integrated electronic device 300 is completed by a chopper+filter 313 which is supplied from the DC power source via two DC terminals. The chopper 313 is also coupled to the excitation coil 40 of the rotor so that the latter is supplied with direct current. The chopper is also electrically coupled to the control unit 312 via two terminals.

Figure 8:
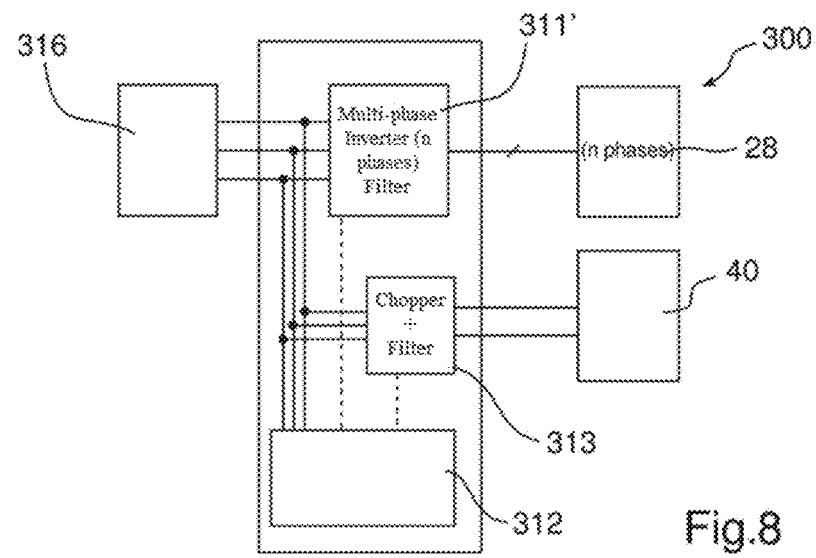
FIG. 8 is another example of the embodiment of an integrated electronic device according to the invention.

In FIG. 8, the electrical machine is a synchronous motor powered by a electric power source 316, here alternating current. The synchronous motor provides the torque required for the rotating element 100. The integrated electronic device 300 comprises an inverter 311, a chopper+filter 313 and a control unit 312 which are configured in a similar way to the previous embodiment. In this example of embodiment, the integrated electronic device comprises a rectifier upstream of the inverter and a rectifier upstream of the chopper. The rectifier and inverter module then comprises three AC terminals coupled to the AC power source and one AC terminal coupled to the winding 28.

The rectifier and chopper module then comprises three AC terminals coupled to the power source and two DC terminals coupled to the rotor excitation coil 40 so that the latter is supplied with DC power. This module is also electrically coupled to the control unit 312.

The control unit 312 generates the control commands for the inverter and chopper to ensure the correct operation of the machine.

Figure 9:
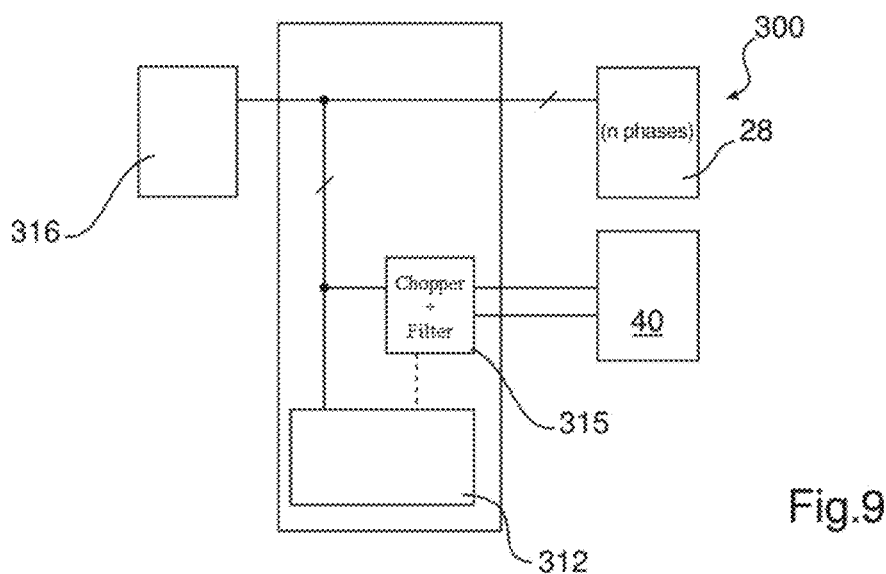
FIG. 9 is another example of the embodiment of an integrated electronic device according to the invention.

In FIG. 9, the electrical machine is a generator delivering a multi-phase alternating current. The integrated electronic device 300 includes a rectifier+chopper+filter assembly 315. The chopper is powered by the electrical power source 316 here AC and coupled to the excitation coil 40. For this purpose, the rectifier+chopper+assembly comprises a current terminal coupled to the AC power source and two current terminals coupled to the excitation coil 40.

The integrated electrical device 300 also comprises the control unit 312 which is electrically connected to the rectifier+chopper+filter 315 and to the AC power source generated by the generator. This control unit 312 is configured to control the chopper so that the excitation of the generator is adapted to the correct operation.

Figure 10:
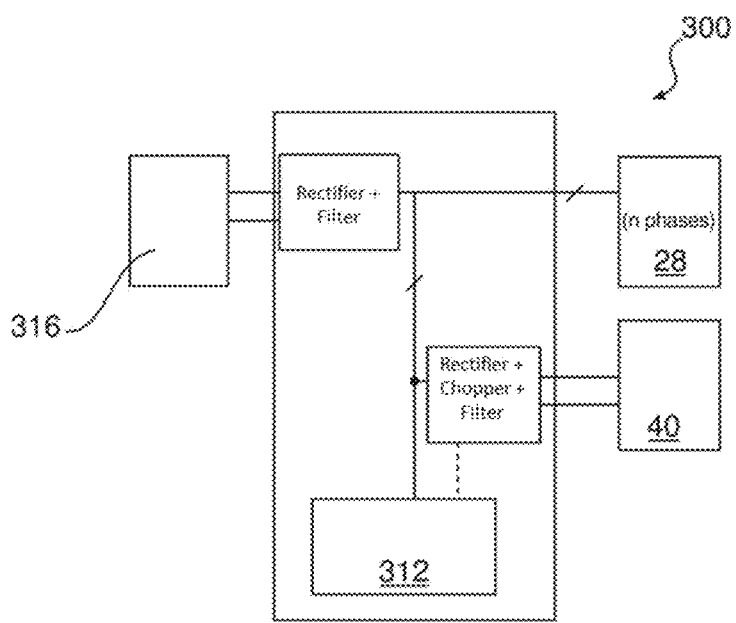
FIG. 10 is another example of the embodiment of an integrated electronic device according to the invention.

FIG. 10 shows an electrical machine 50 constituting a DC generator. This example is comparable to the system shown in FIG. 9, with a rectifier that transforms the AC into direct current to the network.

In the case of an electrical machine powered by an AC power source, the AC electric flux flows axially (along the axis 200 of rotation) through the teeth 26 of the stator 20. Similarly, the alternating electric flux flows circumferentially in the stator 20 (in particular the ring 22) around the axis 200 of rotation. The magnetic flux then flows to the stator.

To limit eddy current losses, the stator 20' shown in FIG. 11 is laminated and is made in one piece. In other words, the laminated stator is a single piece. By making the stator in one piece, the manufacturing costs of it can be minimized. In fact, only one strip sheet metal is needed to make this stator and a limited number of steps are required, as we will see in the following description.

In a first embodiment this laminated stator 20' illustrated in FIG. 11, each tooth 26 comprises a plurality of sheets of ferromagnetic sheet metal arranged, one above the other, along a radial axis perpendicular to the axis of the ring (here the axis 200 of rotation). The ring 22 of the stator 20' also comprises a plurality of sheets of ferromagnetic sheet metal which are arranged along the axis 200 of rotation.

The laminated stator 20' in one-piece is produced by a method shown in part in FIGS. 12 and 13. The method comprises providing a single strip of ferromagnetic sheet metal 400. The latter has a predetermined width L in a first direction. This first direction is parallel to the axis 200 of rotation in an installed state of the stator in the electrical machine. The strip of sheet metal 400 is advantageously flat. The width L is measured between a first side 401 and a second side 402 of the strip of ferromagnetic sheet metal. The first and second sides 401, 402 are opposite in the first direction and are parallel. The strip of ferromagnetic sheet metal 400 also has a first edge 403 and a second edge 404 opposite in a second direction. This second direction is here perpendicular to the first direction.

Several notches 405 are cut in the strip of ferromagnetic sheet metal 400 to form tabs 406. Each tab 406 is defined by two notches on either side of it in the second direction. These are intended to form the teeth 26 of the stator. The notches 405 are arranged in the second direction. Each notch 405 extends from the first side 406 along the first direction and has a width less than that of the strip of ferromagnetic sheet metal. The part of the uncut strip of sheet metal is used to form the ring of the stator.

The strip of ferromagnetic sheet metal 400 is then coiled around a coiling axis 407 in such a way that the tabs 406 are superimposed one above the other radially with respect to this coiling axis. The coiling axis is perpendicular to the second direction and is coaxial with the axis 200 of rotation in an installation situation in the electrical machine.

We then obtain a stator made up of several sheets of this strip of ferromagnetic sheet metal.

According to this embodiment, the gap or distance between each successive notch is defined by the formula $$X+n\cdot e \quad \text{[Math 1]}$$

wherein n is an integer from 0 to K−2 and K is the number of notches.

The calculation of e is made by considering that the stacking or superposition of the tabs of the strip of ferromagnetic sheet metal obtained is an Archimedes' spiral whose pitch e is equal to the thickness of the strip of ferromagnetic sheet metal. Its polar equation is therefore expressed by the following formula:

[Math 2]

$$R(\theta) = \left(\frac{e}{2p}\right) \cdot \theta + R_i$$

wherein Ri is the inner radius of the stator.

It is of course possible to make the notches after coiling the strip of ferromagnetic sheet metal to form the laminated stator.

The notches are made by any type of suitable tool, for example by means of a wire. With such a manufacturing method, there are no geometrical defects in the stator.

FIG. 14 shows another embodiment of an electrical machine 50 with an integrated electronic device 300 which are cooled efficiently in order to improve the performance of the electrical machine. As we have seen in the embodiment of FIG. 5, the integrated electronic device is installed inside the stator. In this example of embodiment, the electrical machine 50 comprises a first housing 29 in which the stator winding 28 and/or the integrated electronic device 300 is/are installed.

As can be seen in FIG. 14, the winding 28 and the integrated electronic device are arranged inside the first housing 29. This first sealed housing 29 contains a cooling fluid 31. The arrangement of the first housing filled with a cooling fluid is possible because the winding 28 is at a distance of least the air gap 52. This first housing allows to isolate the winding 28 and the integrated electronic device 300 from the other components of the electronic machine 50.

As an advantageous, but not limiting characteristic, the cooling fluid 31 is supplied from an external source so that the fluid circulates in the first housing. In this case, the outer surface 32 of the first housing 29 can act as a heat exchanger. Of course, it is not necessary to circulate the fluid inside the first housing.

Figure 15:
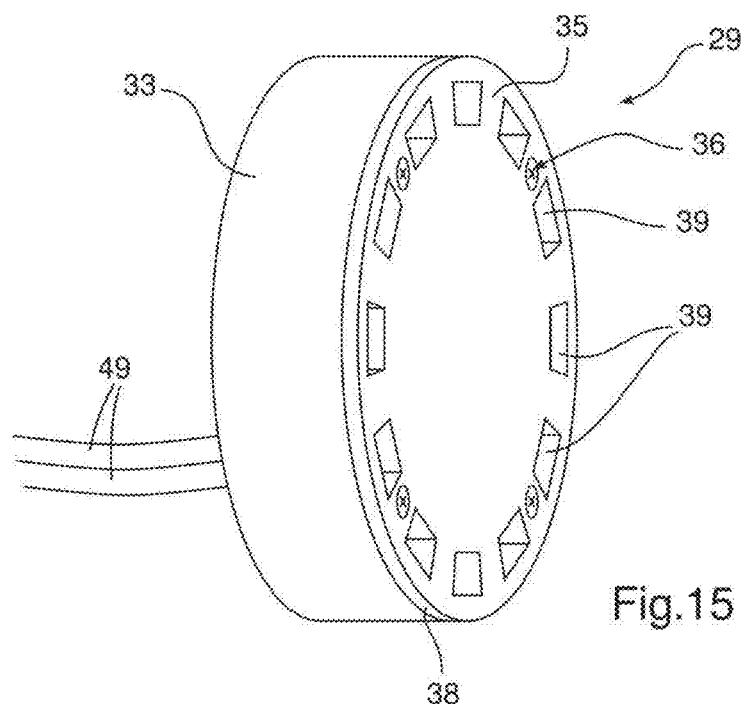
FIG. 15 is a perspective view of a casing in which are accommodated components of an electrical machine such as an integrated electronic device according to the invention.
Figure 16:
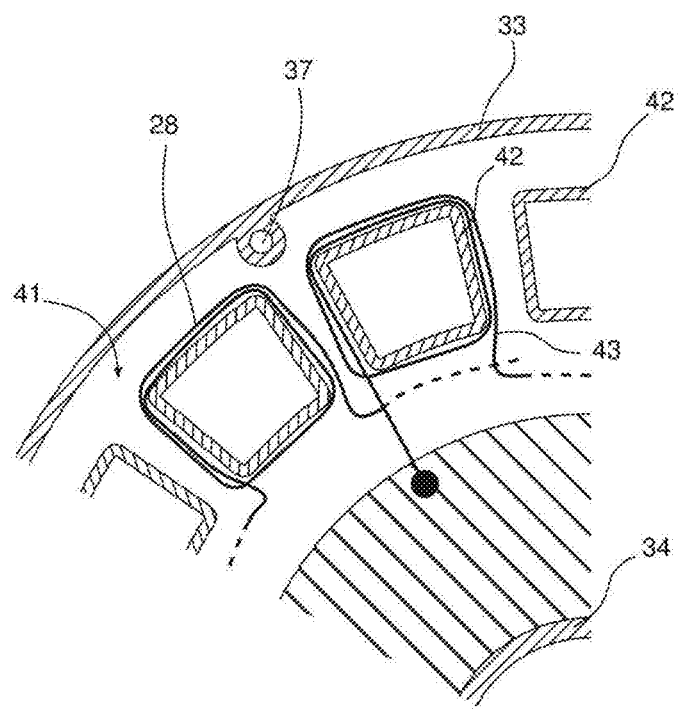
FIG. 16 is a sectional and detailed view of the casing shown in FIG. 16 according to the invention.

With reference to FIGS. 15 and 16, the first housing 29 comprises a radially inner wall 33 and a radially external wall 44 which are annular and coaxial with the axis 200 of rotation. The first housing 29 also comprises a first cover 35 and a second cover (not shown), each in the form of a disc and intended to close the first housing 29 upstream and downstream, respectively, along the axis 200 of rotation. Fastening means 36 such as screws allow to fasten the first and second covers 35 to the radially internal and external walls 33, 35. For this purpose at least the radially external wall 33 comprises orifices 37 (FIG. 16) for receiving the means for fastening. Of course, another arrangement and fastening are also possible.

The seal joints 38 are arranged between each first and second cover 35 and the radially internal and external walls so that the first housing is sealed.

The first cover and the second cover each comprise lights 39 passing through their walls on both sides along the axis 200 of rotation. The lights 39 are distributed evenly and in a circumferential direction.

The second cover comprises passages for power supply cables 49 of the integrated electronic device 300.

In this example of embodiment, the first housing 29 has an external diameter which is larger than that of the stator. The first housing has an inner diameter (defined by the radially internal wall) which is larger than that of the rotating element 100.

Advantageously, the cooling fluid 31 comprises an oil which effectively dampens vibrations which can be detrimental to the connections, for example by soldering the elements composing the integrated electronic device 300.

Advantageously, the oil filling of this housing prevents fire due to an electrical fault.

In an alternative embodiment not shown, the excitation coil 40 is also arranged in a second housing which is filled with a second cooling fluid. This second cooling fluid can also be an oil.

Following an example of the method of assembling of the electronic machine 50 shown in FIG. 14, the first housing 29 is inserted on the stator 20, 20'. Prior to this assembling step, the winding 28 and the electronic device 300 are assembled in the first housing. The winding 28 is pre-formed in advance, i.e. before it is mounted in the electrical machine 50.

For this purpose, the radially internal and external annular walls 33, 34 and the first cover 35 are tightly assembled. The radially internal and external walls extend from an internal face 41 of the first cover.

The winding 28 is respectively arranged around several projections 42 extending from the internal face 41 of the first cover along the axis 200 of rotation. Each of these projections 42 has a rectangular cross-section. The winding 28 is then connected to the integrated electronic device 300 by means of current terminals 43. Then, the second cover is assembled in such a way as to seal the first housing.

The cooling fluid (here oil) is then injected inside the first housing 29.

After insertion of the first cover on the stator, the first cover of the first housing is advantageously, but not limited to, in contact with the ring 22 of the stator 20, 20'.

For this purpose, the teeth 26 of the stator fit into the lights 39 of the first and second covers.

The excitation coil 40 is assembled around the rotor 10 and then the latter is inserted at least partly in the inner zone 30 of the stator 20, 20'.

In the event that the excitation coil 40 is arranged inside the second housing according to an alternative embodiment of the electrical machine, the second housing is first inserted around the intermediate portion 14. The rotor 10 equipped with the second housing is then inserted into the stator 20.

The second housing comprising the excitation coil 40 is similarly configured to the first housing.

Another embodiment is shown in FIGS. 17 to 21 in which the electrical machine has an integrated electronic device 300'.

In this example of embodiment, the electrical machine is completed by a rotor module 500 comprising at least a casing 501, a drive shaft 110, an excitation coil 40 and a magnetic circuit of the rotor. In particular, the casing 501 comprises an annular wall 502 extending (along the axis of rotation 200) from a bottom 503. The latter comprises a plurality of orifices 504 passing through the bottom wall on both sides along the axis 200 of rotation. These orifices 504 are distributed evenly and in a circumferential direction. Each orifice 504 is intended to receive one tooth 26 of the stator. The border 505 of the annular wall 502 delimits an opening which is closed by a flange 506.

As an example, the annular wall 501 comprises slots 507 which extend from the border 505 into the annular wall. The slots 507 are arranged along the circumference of the annular wall.

The drive shaft 110 extends along the axis 200 of rotation and between the flange 506 and the bottom 503. As can be seen in particular in FIG. 21, the drive shaft 110 does not extend beyond the bottom 503 of the casing 501. More specifically, the drive shaft 110 comprises a first end 111 which is coupled to the bottom of the casing and a second end 112 (axially opposite the first end) which passes through the flange 506 and extends outside the casing.

The shaft 110 is rotatably assembled inside the casing. For this purpose rotating guide bearings 509 are assembled upstream and downstream of the drive shaft and inside the casing. The rotating guide bearings 509 comprise in this example bearings with balls 510.

This drive shaft is intended to be coupled to the rotating element 100. Such an arrangement allows to free space for the integrated electronic device 300'. More specifically, the integrated electronic device is full. In other words, it does not comprise a through hole 310 as is the case in the embodiment in FIG. 6.

The integrated electronic device 300' is arranged axially between the bottom 503 of the casing and the rear face 201 of the stator 20, 20'.

The rotor 10 is assembled in the casing 501 and around the drive shaft 110.

In this figure we can see that the maximum length of the first portion 12a of the rotor is smaller than the diameter of the inner zone 30 of the stator 20, 20' and that the first portion 12a of the rotor is arranged in the inner zone 30 of the stator. In other words, the entire rotor 10 is arranged in the inner zone 30 of the stator. The two magnetic pole sequences of the rotor are positioned radially with respect to the magnetic circuit formed by the stator.

The excitation coil 40 is arranged around the intermediate portion 14.

In addition, the rotor module comprises grooves or accommodations each intended to receive at least part of the free end of the teeth of the stator. In particular, the radially internal wall of the casing 501 comprises a plurality of grooves 511 or accommodations extending in the direction of the axis 200 and distributed evenly around this axis. These grooves allow to receive the teeth of the stator in order to immobilize them. This stiffens the assembly. Alternatively, the flange 506 has accommodations evenly distributed circumferentially around the axis 200. This allows at least the free end of the stator teeth to be trapped so as to stiffen the assembly.

The invention claimed is:

1. A synchronous electrical machine configured to drive a rotating element in rotation around an axis of rotation of the electrical machine or to generate electrical energy from the mechanical energy transmitted by said rotating element, wherein the electrical machine comprises:
   a stator disposed around the axis of rotation of the electrical machine, comprising a ring extending along a preferred plane perpendicular to said axis of rotation and comprising a winding and a denture comprising teeth extending parallel to the axis of rotation from the ring, said winding being coiled around the denture according to the preferred plane and the denture delimiting an inner zone of the stator around the axis of rotation,
   a rotor, comprising a first portion extending in p first preferred directions parallel to the preferred plane, a second portion extending in p second preferred directions angularly shifted by $\pi/p$ with respect to the first preferred directions of the first portion and parallel to the preferred plane, and an intermediate portion linking the first portion to the second portion, the rotor being arranged in such a way that at least the second portion and the intermediate portion are in the inner zone of the stator and that the second portion is located on the side of the ring, and
   an excitation coil for exciting the rotor, fixed with respect to the stator, supplied with DC electric current, positioned around the intermediate portion of the rotor and configured so as to generate a magnetic flux in the rotor through magnetic induction, such that the first portion of the rotor constitutes p north magnetic poles of the rotor and the second portion of the rotor constitutes p south magnetic poles of the rotor.

2. The electrical machine according to claim 1, wherein the electrical machine comprises an integrated electronic device which is arranged inside the stator.

3. The electrical machine according to claim 2, wherein the integrated electronic device is arranged in the inner zone of the stator, and between the rotor and a rear face of the ring of the stator along the axis of rotation.

4. The electrical machine according to-claim 2, wherein the electrical machine comprises a first housing comprising a first cooling fluid and in which the winding of the stator or the integrated electronic device are installed.

5. The electrical machine according to claim 2, wherein the electrical machine comprises a second housing comprising a second cooling fluid, the excitation coil being arranged inside this second housing.

6. The electrical machine according to claim 1, wherein the stator is laminated and is formed in one piece.

7. The electrical machine according to claim 1, wherein the electrical machine comprises a casing in which at least the rotor, the excitation coil mounted around the intermediate portion of the rotor and a drive shaft extending along the axis of rotation are accommodated, the drive shaft comprising a first end which is coupled to a bottom of the casing.

8. A method of making a stator of an electrical machine according to claim 1, the method comprising the following steps:
   providing a strip of ferromagnetic sheet metal comprising a predetermined width L in a first direction, the width L being measured between a first side and a second side of the strip of ferromagnetic sheet metal,
   making a plurality of notches by cutting so as to form tabs, and coiling the strip of ferromagnetic sheet metal around a coiling axis so that several tabs are superimposed along a radial axis perpendicular to the coiling axis.

9. The method of making a stator according to claim 8, wherein a distance between each successive notch of said plurality of notches is defined by a formula:

$$X + n \cdot e$$

wherein X is a distance from an innermost notch that is closest to a position where the coiling the strip of ferromagnetic sheet metal begins, and n is an integer from 0 to K−2 and K is a number of notches, wherein e is determined by coiling or superimposing the tabs in a spiral of Archimedes and is calculated according to a formula:

$$R(\theta) = \left(\frac{e}{2p}\right) \cdot \theta + R_i$$

with R(θ) being a radius of the spiral, and Ri being an inner radius of the stator.

10. A method of assembling a synchronous electrical machine according to claim 1, the method comprising the following steps:

assembling a first sealed housing comprising a first cooling fluid, the stator winding or an integrated electronic device, inserting a first housing assembled on the stator, and at least partially inserting the rotor in the inner zone of the stator.

* * * * *